Patented Sept. 5, 1939

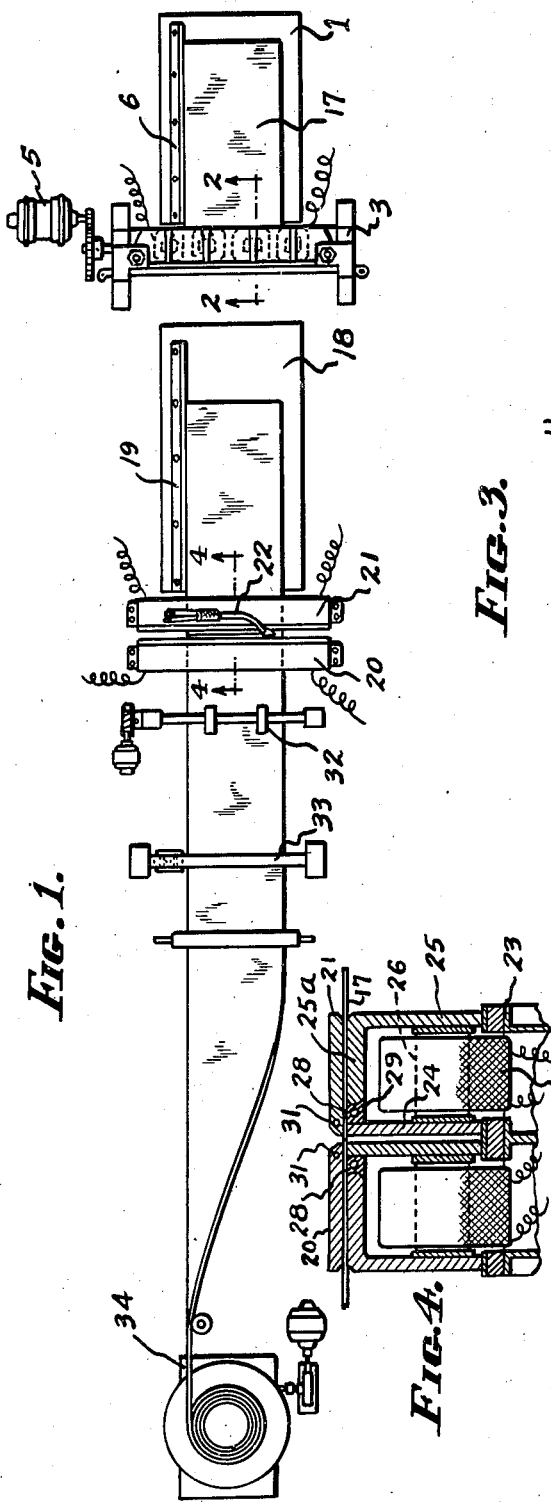
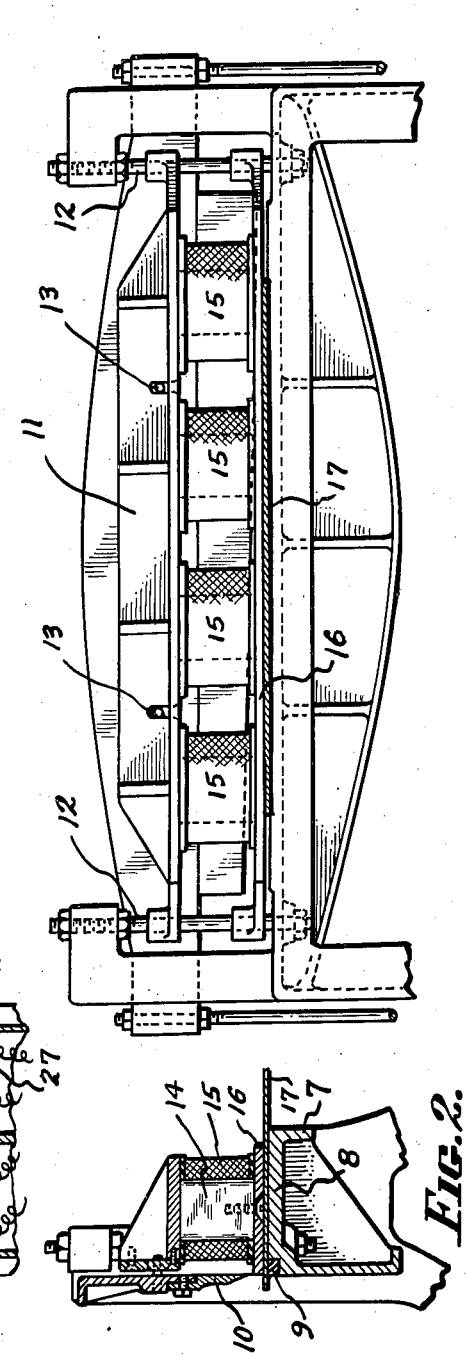

2,172,081

UNITED STATES PATENT OFFICE

2,172,081

PROCESS AND APPARATUS FOR SECURING ACCURATELY BUTTED SHEET ENDS FOR WELDING

James E. Fay, Middletown, and Eo Reed, Zanesville, Ohio, assignors to The American Rolling Mill Company, Middletown, Ohio, a corporation of Ohio Application March 24, 1937, Serial No. 132,825

10 Claims. (Cl. 113—59)

Our invention relates to procedures preparatory to the formation of butt welds in thin sheet metal material, and to mechanism involved therein. Our invention has utility in the formation of butt welds in any sheets or strips of thin metal capable of joining by fusion and including but without limitation, silicon steel, stainless steel, other alloys of iron or steel, magnetic or non-magnetic in character, and the various non-ferrous metals and alloys thereof.

By way of example of what we mean by thin sheets or strips, we may refer primarily to materials ranging from .012 inch to .025 inch in thickness, or say from 22 or 24 gauge to 30 gauge material; but we have handled both lighter and heavier materials with entire success, so that these values are exemplary only and are not limiting. The procedure and apparatus herein set forth have special application to materials within these ranges of thickness because of the peculiar problems involved. When working with substantially heavier materials, in most instances, these problems are less apparent or are substantially non-existent. In other words, the particular provisions and precautions to which this invention is addressed are not usually necessary in the welding of heavier materials.

Our invention is especially addressed to means and a method for handling thin strip or sheet metal which is not characterized by flatness.

The fundamental object of our invention is the provision of means and a method for securing accurately butted sheet or strip ends for welding and the maintenance of the accurately butted condition during the operation of welding. The utility of our invention is not limited to any particular means for or method of securing fusion of the metal at the butted sheet ends, and is applicable, for example, but again without limitation, to the formation of butt welds by electrical resistance welding. In a copending application of James E. Fay and Eo Reed, entitled Welding process and apparatus for thin sheet metal, filed March 24, 1937, Serial No. 132,824, our apparatus and procedure has been described for the formation of butt welds in thin sheet stock by flame welding; and for the purpose of an exemplary disclosure of our present invention, we shall describe it in connection with the welding means and apparatus of the said copending application.

In the welding operation the adjacent ends of thin sheets or strips to be joined are clamped in butted relationship. Not only is it necessary to provide a configuration of the sheet ends which will permit accurate butting if clamped along the whole length of the sheet ends; but it is necessary to make provision whereby the accurately butted condition of the sheet ends throughout their length is not disturbed by heat conditions derived from the welding operation itself, or from previous welding operations. The solution of these problems forms ancillary objects of our invention.

These and other objects which will be set forth hereinafter or will be apparent to one skilled in the art upon reading these specifications, we accomplish by that certain structure and arrangement of parts and in that certain method of which we shall now describe the aforesaid exemplary embodiment. For clearness, reference is now made to the drawing wherein—

Figure 1 is a semi-diagrammatic plan view of shearing, welding and coiling apparatus for thin sheet metal.

Fig. 2 is a sectional view taken across the shear element shown in Fig. 1 and taken along the lines 2—2.

Fig. 3 is an elevational view of the shear.

Fig. 4 is a sectional view through the clamping means of the welding apparatus taken along the lines 4—4 of Fig. 1.

Briefly, in the practice of our invention, we have found that the desired physical relationship of the sheet ends can only be obtained for a welding operation, by shearing the sheet ends while clamping them under the same conditions during shearing as are to be employed during welding; and then clamping during the welding under conditions which prevent a disturbance of this relationship, as will be more fully described hereinafter.

Some sort of a hold-down for the shear is, of course, required; but with materials not characterized by flatness the conformation of the sheared sheet or strip will be determined not by the conformation of the shear knife alone, but by the degree to which the thin sheet material was flattened out during the operation of cutting. If sheet ends are sheared by the same shear and under the same conditions of hold-down pressure, they can be accurately butted together, but only if the hold-down pressure at the butting points is the same as that which was used during the shearing. Any variation in the hold-down pressures at the two points will disturb the true butted relationship of the sheet ends, for reasons which will now be apparent.

While mechanical hold-down means may be used, and while our invention is not exclusive of these, we have found that the most convenient clamping means are magnetically actuated means. In such means the various factors are much more readily and accurately controlled. Among these factors are clamping pressure and the effective width of the clamping means, since it will be clear that the conformation of the sheet ends will be governed not alone by the pressure with which they are held down to a predetermined surface, but also by the width of the hold-down means, i. e., the area of the sheet which is flattened out against the surface by the hold-down means.

In Fig. 1 we have illustrated at 1 a shear table and at 3 a shear, the movable knife of which is driven by a suitable source of power 5. The table is, of course, provided with an appropriate guide 6. As shown in Fig. 2, the shear has a frame 7, the upper part of which forms part of the table 8. It is provided with a fixed knife 9 and a movable knife 10. The movable knife will be understood as power actuated in any of the known ways. The hold-down means in this instance comprises an upper head 11 slidably mounted in some suitable way on the frame of the shear. Here it is shown slidably mounted upon rods 12 on the frame, and having a lost motion connection 13 with the movable knife of the shear, so that the raising of the knife to its highest position at the end of a shearing stroke will raise the clamping head 11. The connection is such, however, that the clamp mechanism can come into action upon the sheet metal to be sheared prior to the actual shearing.

A plurality of core means 14 are affixed to the head 11 at intervals, and thees are provided with magnetic windings 15. At the bottom of the core members 14 clamping means 16 is attached and may also be mounted slidably upon the rods 12. The magnetic windings are connected to a suitable source of power not shown. The clamping means 16 forms a common pole piece in this construction for the magnetic means, comprising the cores 14 and the windings 15. The clamping means 16 is made quite wide, and it is necessary further that the width of these clamping means at the shear be substantially the same as the width of the clamping means at the welding device. As a general rule, the clamping means should be as wide as is practicable within good operating limits upon any given machine. The wider the area of the sheet which is clamped, the more accurate are likely to be the results. However, the exact width of the clamping means is not critical so long as the same critical means are used for shearing and for welding. We are currently employing clamps approximately eight inches wide. We have successfully used narrower ones. In the operation of the shear, it will be evident that as a sheet 17 is brought against the guide 6 and aligned for shearing and the shear mechanism started, the clamping means 16 will first come into contact with the upper face of the sheet. There will be manually or automatically actuated means for applying power to the magnetic clamping structure, and when this power is applied the sheet 17 will be clamped between the table portion 8 and the clamping means 16 under a great force. This force, however, is readily and accurately controllable in accordance with the power applied. A given area is thus flattened out under a given and controllable force. As soon as this happens the movable knife 10 descends and shears the end of the sheet. At the conclusion of the shearing structure the knife rises again, and after the blade has passed the sheared end of the sheet, the further movement of the knife tends to raise the clamping means, the current to the magnets having been manually or automatically cut off. We have shown in the various figures an organization of apparatus designed for the shearing of the ends of sheets with a rectilinear cut. In the use of this apparatus it is usual to shear one end of a number of sheets, stack them, turn them around, and then shear the other end, after which the sheets are ready for butting and welding. Modifications in the apparatus for handling strip instead of sheets will be well within the skill of the worker in the art to devise.

After the sheet ends have been sheared, the sheets may be passed over a table 18, also preferably provided with a guide 19 for longitudinal alignment, and the sheet ends may be butted and clamped for welding. The sheet ends may be accurately butted providing the clamping conditions are exactly the same as the conditions obtaining when the sheet ends were sheared. To this end the welding mechanism comprises clamping means 20 and 21, of the same character as the clamping means used in connection with the shear and capable of exerting the same force over the same area. We have shown in Fig. 1 the welding being carried on by means of a torch 22, but this is not a limitation upon the present invention.

In the welding means, especially where a torch is used, it is advantageous to locate the bulky electromagnetic portions of the clamping means below the sheet level; but this again can be departed from where desired. We have shown in Fig. 4 a particular type of clamping means where, on the frame 23 of the welding device, magnetic means comprising a pole piece 24 and a pole piece 25, joined by a core member 26 are rigidly mounted. The core member bears a winding 27. The upper end of the pole piece 25 is bent over as at 25a and approaches the end of the pole piece 24. Between the end of the pole piece 24 and the end of the pole extension 25a we prefer to insert a mass of non-magnetic metal 28. This may advantageously be copper, deposited by welding between the ends of the pole pieces. The block may be perforated as at 29 for the passage of a temperature controlling medium. The upper surface of the pole piece 24, the block 28 and the pole extension 25 may then be machined to provide a smooth surface or table. The clamping means is completed by an upper clamping member 30 overlying the sheet 17. The width of the member 30 and the magnetic means should, as has previously been indicated, be the same as the width of the clamping means on the shear. Opposed clamping means are provided at the welding point as clearly shown in Fig. 4.

For welding, it is usual first to clamp, by means of the clamping device 20, the trailing end of the strip having an accurately sheared edge; then the leading end of a succeeding strip or sheet is brought into the clamp 21 butted against the end of the strip previously clamped, and the clamp 21 actuated to hold it there. Since the clamp means 20 and 21 are magnetically actuated and are of the same effective area as the clamp means of the shear, the power applied can be controlled to bring about conditions of identical pressure so as to assure the accurate butting of the sheet ends.

By these means we have succeeded in completely obviating any inaccuracies in the butting of the sheet ends which arise from a lack of flatness in the strips or sheets to be joined. If the sheet ends are clamped under a given pressure and under a given area while being sheared, and if the sheet ends are again clamped when butted under an identical pressure effective over the same area, the butted ends will exactly conform one to another. However, there is another factor involved in the maintenance of a true butted relationship and this is the factor of temperature. It will be understood that even if true edges are obtained by clamping for welding under the same conditions as obtained when clamping for shearing, yet the sheet ends may depart from an accurately butted relationship if they are subjected to unequal temperature conditions. Thus if two sheets are clamped with their ends, for example, cut along a true straight line, and if these sheets are heated in the center more than at the edges, they will expand more in the center and true butting will be impossible because the sheet ends tend to depart from the straight line by assuming an oppositely related curvature. As a consequence, means must be provided not only for clamping the sheets for welding under the same conditions as obtained when the sheets were sheared, but also for preventing a disturbance of these conditions by the effect of temperature. Unequal temperatures may be applied to the sheets not only by the welding operation per se, but also by the absorption of heat into parts of the apparatus from a former welding operation. As a consequence, it becomes necessary, whatever the character of the welding operation, to confine the development of heat to the actual sheet ends and also to prevent the unequal heating or cooling of the clamping members. It will be clear that the clamping pressure must be effective on the sheets closely adjacent the sheet ends. As a consequence, means must be provided for controlling the temperature of the clamping means adjacent the sheet ends. We have already indicated that the lower clamping mechanism in Fig. 4 may be provided with a cooling channel 29. The upper clamping means 30 are also provided near the butted joint with a perforation 31. Appropriate delivery connections for a cooling medium are made to the perforations 29 and 31. Water is a convenient cooling medium. In the way indicated, the clamping means may be kept at an even temperature so as not to disturb the accurately butted condition of the sheet ends and so as to confine the heat developed by welding to an area very closely adjacent the sheet ends. We have found that by the method and apparatus which we have described in an exemplary embodiment we are enabled to secure and maintain the accurately butted condition of the sheet ends which is essential to the welding of thin sheet material.

After the welding has been accomplished a moving means 32 for the strip may withdraw the weld from the welding device upon release of the clamping pressure and may be employed to position the weld in a rolling means 33 for the weld. Afterward the strip material thus formed may be coiled, if desired, by a mechanism indicated at 34 and described in the copending application of Ralph E. Asbury and Eo Reed, entitled Process and apparatus for coiling strip material, filed March 24, 1937, Serial No. 132,826. For many materials, however, other coiling means may be employed.

Modifications may be made in our invention without departing from the spirit of it.

Having thus described our invention, what we claim as new and desire to secure by Letters Patent is:

1. A process of preparing thin sheet metal for welding, which comprises clamping the ends of strips or sheets under a given pressure effective over a given area adjacent the proposed line of cut and shearing, afterward butting the sheared ends of said strips or sheets and clamping them under the same pressure effective over the same area of the strips or sheets whereby to bring about an accurate conformation of the ends of said sheets or strips in said butted relationship.

2. A process of preparing thin sheet metal for welding, which comprises clamping the ends of strips or sheets under a given pressure effective over a given area adjacent the proposed line of cut and shearing, afterward butting the sheared ends of said strips or sheets and clamping them under the same pressure effective over the same area of the strips or sheets whereby to bring about an accurate conformation of the ends of said sheets or strips in said butted relationship, and maintaining substantially constant the temperature of the means for clamping said strip for welding whereby to obviate a disturbance of the butted relationship by temperature variations.

3. A process of preparing materials for welding which comprises clamping the ends of sheets or strips under a given pressure effective over a given area adjacent the proposed line of cut and shearing the ends of the said strips while so clamped, afterward butting the ends of said strips or sheets and clamping them in butted relationship under conditions of equal pressures effective over the same areas thereof.

4. A process of preparing materials for welding which comprises clamping the ends of sheets or strips under a given pressure effective over a given area adjacent the proposed line of cut and shearing the ends of the said strips while so clamped, afterward butting the ends of said strips or sheets and clamping them in butted relationship under conditions of equal pressures effective over the same areas thereof, and maintaining substantially constant the temperature of the means for clamping said strip for welding whereby to obviate a disturbance of the butted relationship by temperature variations.

5. A process of preparing sheet or strip material for welding, which comprises clamping said material in magnetic clamping means having a given area and actuating said clamping means by a given effective force and shearing said material closely adjacent the clamped area, afterward butting the sheared ends of said strips or sheets for welding and clamping them over the same areas in magnetic clamping means of the same effective area and under the same application of magnetic force, and closely adjacent the sheared ends thereof.

6. A process of preparing sheet or strip material for welding, which comprises clamping said material in magnetic clamping means having a given area and actuating said clamping means by a given effective force and shearing said material closely adjacent the clamped area, afterward butting the sheared ends of said strips or sheets for welding and clamping them over the same areas in magnetic clamping means of the same effective area and under the same application of magnetic force closely adjacent the sheared ends thereof, and maintaining substantially constant the temperature of the means for clamping said strip for welding, whereby to obviate a disturbance of the butted relationship by temperature variations.

7. Means for preparing thin strip or sheet material for the formation of butt welds therein, which comprises in combination a shear having knives and hold-down means, closely adjacent said knives, of a given effective area, and means for applying a given pressure to said hold-down means during shearing, and welding means for the same material involving means for holding said sheet or strip edges in butted relationship and comprising hold-down means having the same effective areas of the hold-down means as on said shear, and means for applying to said last mentioned hold-down means the same force as was applied to the hold-down means on said shear, and in the same relationship to the sheared edges thereof.

8. Means for preparing strip or sheet material for the formation of butt welds therein, and comprising shearing means for trimming the ends of said strip or sheet material, and means for positioning the same strip or sheet material with its ends butted for the formation of a butt weld, said shearing means and said last mentioned means having hold-down means of the same clamping areas and designed to exert the same pressures, and located respectively closely adjacent the line of cut produced by said shearing means and at the same distance from the butted ends of said material when in said positioning means, whereby to apply to the ends of said sheets or strips substantially the same pressures effective over substantially the same areas thereof during shearing as during welding.

9. Means for preparing strip or sheet material for the formation of butt welds therein, and comprising shearing means for trimming the ends of said strip or sheet material, and means for positioning the same strip or sheet material with its ends butted for the formation of a butt weld, said shearing means and said last mentioned means having hold-down means of the same clamping areas and designed to exert the same pressures, and located respectively closely adjacent the line of cut produced by said shearing means and at the same distance from the butted ends of said material when in said positioning means, whereby to apply to the ends of said sheets or strips substantially the same pressures effective over substantially the same areas thereof during shearing as during welding, and temperature controlling means for said last hold-down means.

10. Means for preparing strip or sheet material for the formation of butt welds therein, and comprising shearing means for trimming the ends of said strip or sheet material, and means for positioning the same strip or sheet material with its ends butted for the formation of a butt weld, said shearing means and said last mentioned means having hold-down means of the same clamping areas and designed to exert the same pressures, and located respectively closely adjacent the line of cut produced by said shearing means and at the same distance from the butted ends of said material when in said positioning means, whereby to apply to the ends of said sheets or strips substantially the same pressures effective over substantially the same areas thereof during shearing as during welding, said hold-down means being magnetic means.

JAMES E. FAY.
EO REED.